UNITED STATES PATENT OFFICE.

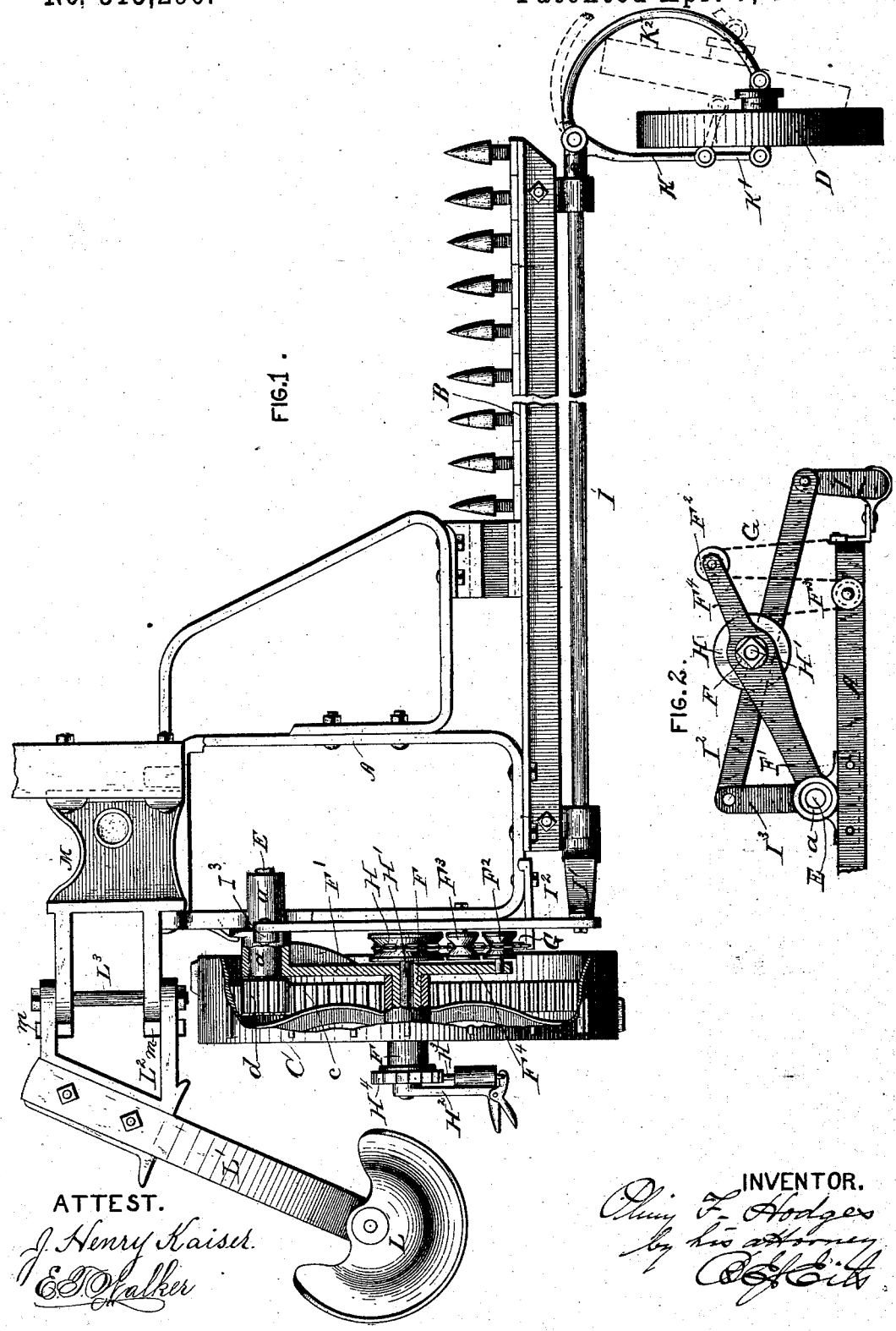

PLINY F. HODGES, OF CHICAGO, ILLINOIS.

GRAIN-BINDER.

SPECIFICATION forming part of Letters Patent No. 315,290, dated April 7, 1885.

Application filed February 15, 1884. (No model.)

*To all whom it may concern:*

Be it known that I, PLINY F. HODGES, a citizen of the United States, residing at Chicago, in the county of Cook and State of Illinois, have invented certain new and useful Improvements in Grain-Binders; and I do hereby declare the following to be a full, clear, and exact description of the invention, such as will enable others skilled in the art to which it appertains to make and use the same.

This invention relates, mainly, to the means for adjusting the cutting apparatus of harvesting-machines, and, incidentally, to the mode of mounting the grain-wheel, the last-mentioned part of the invention being more particularly adapted for use in connection with the first part thereof, although it may be used separately on machines containing means other than those to be described for adjusting the cutting apparatus.

My improvement consists of certain novel combinations, which I will proceed to first describe, and then point out specifically in the claims at the close of this specification.

In the annexed drawings, Figure 1 illustrates, partly in plan view and partly in section, such parts only of a harvesting-machine embodying my improvements as appear to be necessary to show such improvements and the manner of applying them. Fig. 2 is a detail view of part of the mechanism for adjusting the cutter apparatus.

The same letters of reference indicate identical parts in all the figures.

The main frame A of the machine and the finger-beam B of the cutting apparatus thereof are firmly bolted together. The machine is supported upon a drive-wheel, C, and a grain-wheel, D. The drive-wheel C is provided with an internal ring of cogs, $c$, which drives the pinion $d$ on one end of the main shaft E of the machine. This shaft E is supported at one end in a long sleeve-bearing, $a$, on the forward end of the main frame, and this sleeve-bearing also forms a pivot by which the forward end of the main frame is pivoted to the forwardly-projecting crank-arm $F'$ of the hollow axle F, which is fitted in the hub of the drive-wheel C. A rearwardly-projecting arm, $F^4$, of the hollow axle F carries a sheave, $F^2$. The rear end of the main frame is connected by a chain, G, to a chain-drum, H. One end of the chain is secured to the main frame, from which point it passes over the sheave $F^2$ on arm $F^4$, from which it passes downward and under a sheave, $F^3$, journaled on the main frame, and from the sheave $F^3$ the chain passes upwardly to the chain-drum, to which its other end is secured. The drum H is secured to the inner end of shaft $H'$, which is journaled in hollow axle F, projecting through the outer end thereof to receive a hand-lever, $H^2$, by which the shaft and drum may be turned to wind up the chain G more or less for the purpose of adjusting the main frame and cutting apparatus. The hollow axle F carries at its outer end a fixed toothed wheel, $H^4$, adapted to be engaged by a spring-latch, $H^3$, combined with the hand-lever $H^2$, in the usual manner. By means of this toothed wheel $H^4$ and the spring-latch $H^3$ the chain-drum H may be locked after proper adjustment of the main frame and cutting apparatus.

In order that the grain end of the cutting apparatus may be adjusted as to the height on the grain-wheel D simultaneously with the adjustment of the main frame on the drive-wheel, I connect the axle of the grain-wheel with a transverse rock-shaft, I, journaled in suitable bearings back of the finger-beam. The stubble end of the rock-shaft I is provided with an upwardly-projecting crank, $I'$, which is connected by a connecting-rod, $I^2$, to an upwardly-projecting arm, $I^3$, on the sleeve of crank-arm $F'$, which forms the support for the sleeve-bearing $a$ on the main frame. In raising and lowering the main frame on the drive-wheel the crank-arm $F'$, with its arm $I^3$, is rocked, and thus the point where the connecting-rod $I^2$ is attached to arm $I^3$ approaches or recedes from the axis of rock-shaft I, so that the connecting-rod $I^2$ is thrust or pulled endwise and rocks the rock-shaft I by means of its crank $I'$. The grain end of the rock-shaft I is connected with the axle of the grain-wheel D through the medium of a rearwardly-projecting arm, K, fixed on the end of the rock-shaft, and a link, $K'$, connected by vertical pivots to arm K and the axle of the grain-wheel respectively. The axle of the grain-wheel is journaled in the hub of said wheel, so that it can turn therein.

The described parts for connecting the axle of the grain-wheel with the crank-arm $F'$ are constructed, proportioned, and arranged with reference to one another in such manner that a change in the elevation of the main frame at the drive-wheel will effect an equal change in the elevation of the cutting apparatus at the grain-wheel.

It will be observed that the arm K and link K' constitute a stiff or inflexible connection between the rock-shaft I and the axle of the grain-wheel in vertical directions, and that so far as vertical adjustments of the grain end of the cutting apparatus with reference to the grain-wheel are concerned the rock-shaft I might be connected by a single rearwardly-projecting arm with the axle of the grain-wheel. I use the vertically-pivoted link K' in order that the grain-wheel may turn pivotally to assume a more or less oblique position, as shown in dotted lines, to facilitate the turning of corners in harvesting a field of grain. The pivotal turning of the grain-wheel should be limited by some means. I have shown one means for this purpose, consisting of a curved link, K², vertically pivoted at its ends to the arm K and the axle of the grain-wheel respectively. The link K' is quite short, and in turning pivotally the grain-wheel takes a position but little in advance of its normal position, (that indicated in full lines,) so that the balance of the machine will not be seriously disturbed by the shifting of the grain-wheel from either position to the other. The arm K merely constitutes a drag-bar for the grain-wheel, so far as the connection of the latter with the cutting apparatus is concerned.

The driver's seat L is arranged at the outside or stubble side of the drive-wheel.

I find that in order to afford sufficient room for the convenient operation of the hand-lever H² the driver's seat requires to be projected outwardly so far as to widen the machine to such extent that it probably could not be driven through ordinary farm-gates. To overcome this difficulty I pivot the seat-bar in such a manner that it and the seat it carries may be folded over the drive-wheel. To this end the seat-bar casting L² is pivoted by a longitudinal bolt, L³, to the tongue-casting M, the latter being provided with suitable stops, m, to properly support the seat-bar casting when the seat is unfolded.

It is obvious that the main frame may be suspended from the chain-drum direct by the chain without the intervention of other parts; that the chain-drum need not necessarily be supported on the shaft which drives it, and that other modifications of the details of construction may be made without departing from the main principle of my invention.

It will be observed that the link K², in connection with the link K', controls the line of the axis of the grain-wheel.

It is evident that the link K² may curve upward, so as to allow the grain-wheel to turn under it, which would decrease the width of the machine.

The invention herein claimed is a reserved part of the invention described in my United States Patent No. 299,643.

I claim as my invention—

1. The combination, substantially as before set forth, of the drive-wheel, the hollow crank-axle thereof, the main frame pivotally connected at one end with the crank of said axle, the chain-drum and chain for suspending the main frame, and the shaft for operating said chain-drum supported in said hollow axle.

2. The combination, substantially as before set forth, of the drive-wheel, the hollow crank-axle thereof, the main frame pivotally connected at one end with the crank of said axle, the chain-drum and chain for suspending the main frame, the shaft for operating said chain-drum supported in said hollow axle, and means, substantially such as described, for locking the shaft to the axle.

3. The combination, substantially as before set forth, of the hollow axle of the drive-wheel, the forwardly-projecting crank of said axle, the main frame pivotally connected at its forward end to said crank, the chain-drum supported by its shaft in the hollow axle, the rearwardly-projecting arm of said axle, and the chain for suspending the main frame.

4. The combination, substantially as before set forth, of the drive-wheel, the hollow axle thereof provided with a forwardly-projecting crank-arm, the main frame pivoted at its forward end to said crank-arm, the chain-drum and chain for suspending the main frame, the transverse rock-shaft connected at one end with the axle of the grain-wheel, and provided with a crank at the other end, the arm I³ on the crank-arm of the axle of the drive-wheel, and the connecting-rod for connecting arm I³ to the crank on said rock-shaft.

5. The combination, substantially as before set forth, of the grain-wheel, the axle journaled in the hub of said wheel, a drag-bar for said grain-wheel, and the vertically-pivoted link for connecting the rear end of said drag-bar and said axle.

6. The combination, substantially as before set forth, of the grain-wheel, the axle journaled in the hub of said grain-wheel, a drag-bar for said grain-wheel, the vertically-pivoted link for connecting the rear end of said drag-bar with said axle, and a second vertically-pivoted link for connecting the said axle to the front end of said drag-bar.

In testimony whereof I affix my signature in presence of two witnesses.

PLINY F. HODGES.

Witnesses:
C. M. CASTLE,
HENRY HONKOMP.